J. C. BOWERMAN.
INSECT DESTROYER.
APPLICATION FILED MAR. 18, 1916.
1,208,467.
Patented Dec. 12, 1916.
2 SHEETS—SHEET 2.
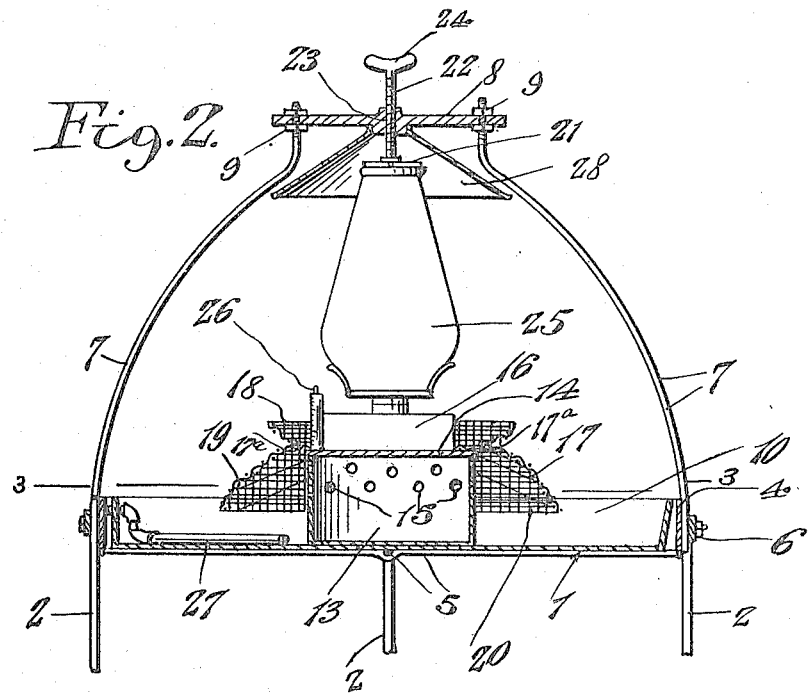
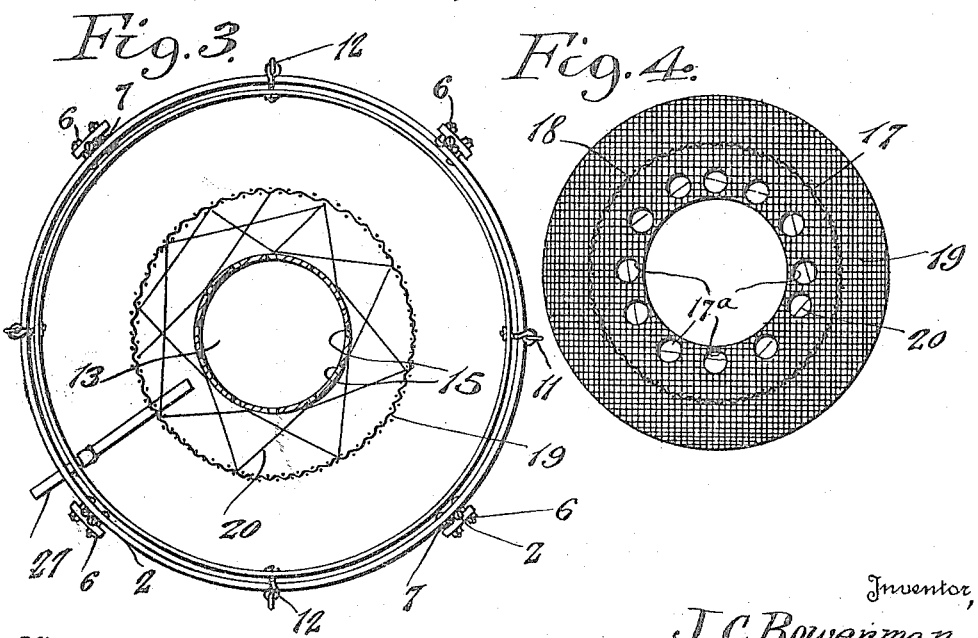
Inventor,
J. C. Bowerman.
Witnesses:—

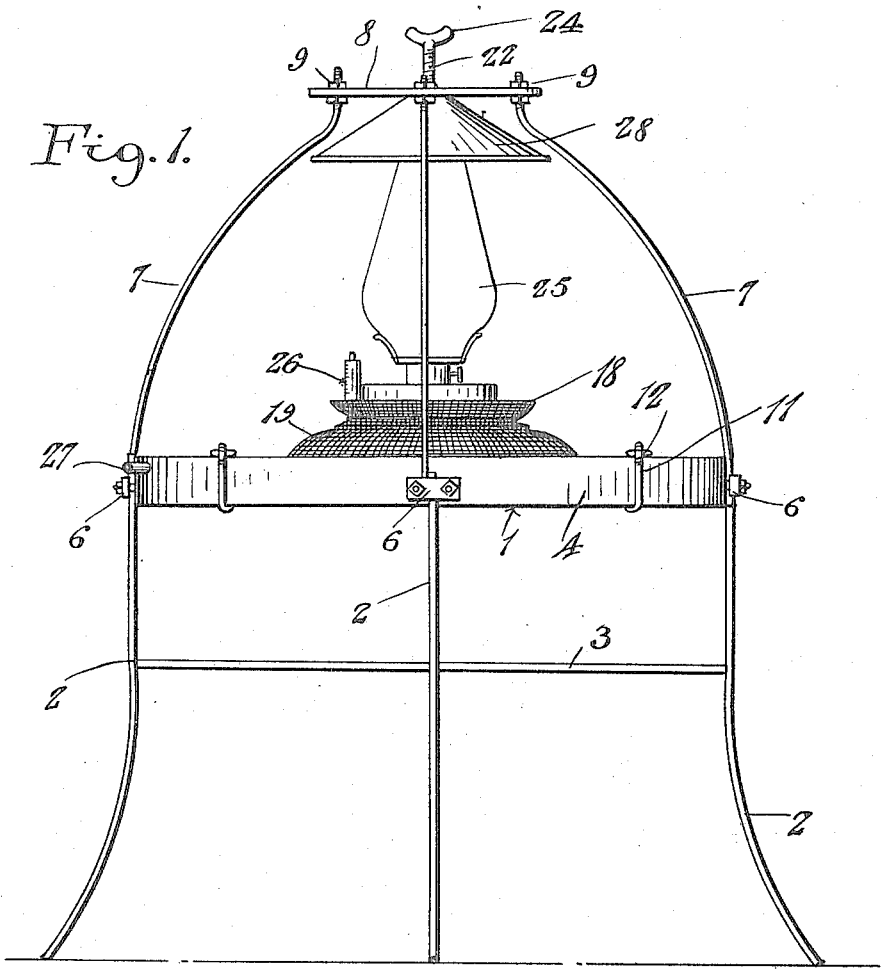
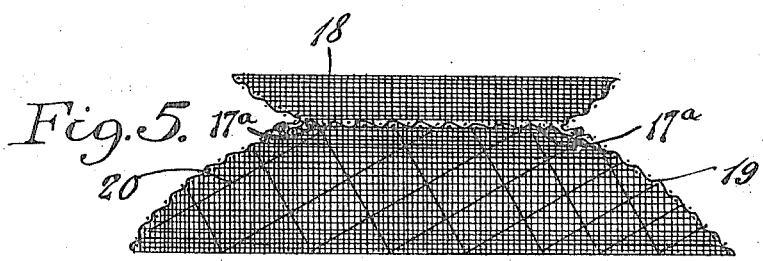

UNITED STATES PATENT OFFICE.

JOHN C. BOWERMAN, OF CEDAREDGE, COLORADO.

INSECT-DESTROYER.

1,208,467.      Specification of Letters Patent.      Patented Dec. 12, 1916.

Application filed March 18, 1916. Serial No. 85,077.

*To all whom it may concern:*

Be it known that I, JOHN C. BOWERMAN, a citizen of the United States, residing at Cedaredge, in the county of Delta and State of Colorado, have invented certain new and useful Improvements in Insect-Destroyers; and I do hereby declare the following to be a full, clear, and exact description of the invention, such as will enable others skilled in the art to which it appertains to make and use the same.

The invention relates to improvements in insect destroyers.

The object of the present invention is to improve the construction of insect destroyers and to provide a simple, inexpensive and efficient insect destroyer adapted to attract all kinds of insects both those which are injurious to crops, fruits, vegetables and the like and also those which are a menace to health and capable of effectively destroying such insects.

A further object of the invention is to provide an insect destroyer of this character adapted to be operated at a comparatively small cost and capable of effective operation in both the day time and night time.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawing Figure 1 is a side elevation of an insect destroyer constructed in accordance with this invention, Fig. 2 is a central vertical sectional view of the same partly in elevation, Fig. 3 is a horizontal sectional view taken substantially on the line 3—3 of Fig. 2, Fig. 4 is a horizontal sectional view on the line 4—4 of Fig. 2, Fig. 5 is an enlarged vertical sectional view of the hood and the deflecting screen.

Like numerals of reference designate corresponding parts in the several figures of the drawings.

In the accompanying drawings in which is illustrated the preferred embodiment of the invention, the insect destroyer comprises in its construction a supporting stand or frame composed of a horizontal support 1 and legs 2 which are connected by horizontal braces 3 which are crossed at the center are also adapted to support a weight to enable the insect destroyer to be anchored to prevent the same from being blown over in a high wind. The legs 2 are preferably curved outwardly as shown to provide a relatively broad base and the support comprises a marginal band 4 of suitable metal and horizontal connecting wires 5 which are suitably secured to the band but any other suitable connecting means may of course be employed. The legs are secured at their upper ends to the band 4 by suitable clamps 6 which also fasten the lower ends of arched braces 7 to the exterior of the said band 4. The upper ends of the braces 7 which extend inwardly and upwardly are connected by a top plate 8 which is pierced by the terminals of the braces 7 and the latter are preferably curved as shown. Nuts or any other suitable means may be employed for securing the ends of the braces 7 to the connecting top plate. The stand supports a reservoir 10 consisting of a shallow pan or receptacle of slightly less diameter than the band of the stand and detachably secured to the same by a clamp 11 suitably secured at their lower portions to the stand and having hook shaped upper terminals 12 which engage over the upper edge of the side wall of the reservoir. The receptacle or reservoir which is designed to contain a poisonous liquid is provided with a central bait receptacle 13 soldered or otherwise secured to the bottom of the reservoir and designed to contain a suitable bait for attracting the insects to the reservoir or receptacle to cause the same to fall into the reservoir and be destroyed by the poisonous contents thereof. The bait receptacle which has a removable cover 14 is provided above the level of the liquid within the reservoir with perforations 15 to enable the odor of the bait to escape and attract the insects. The bait receptacle constitutes a support for a lamp 16 and it also carries a hood 17 and a guard or deflecting screen 18 for directing the insects downwardly. The hood 17 also consists of a screen and it is approximately dome-shaped or bell-shaped and of annular formation to fit the bait receptacle and its lower edge terminates short of the surface of the liquid by preferably about one-quarter of an inch so that insects crawling around the lower edge will be affected by the fumes of the poisonous liquid sufficiently to cause them to fall into the receptacle or reservoir and be destroyed. The hood screen is provided with openings 19 of sufficient size to permit the insects to readily pass through them from the exterior of the hood to the interior thereof and within the hood are arranged wires 20 preferably of a fine gage and adapted to intercept the insects which by flying against such wires are caused to drop into the poisonous liquid of the reservoir. The deflecting screen 18 extends upwardly and outwardly from the upper or inner portion of the hood and it is suitably secured to the same and is adapted to be removed with the hood from the bait receptacle.

The lamp 16 which may be of any desired construction is secured firmly upon the bait receptacle by means of a clamp consisting of a cap 21 preferably in the form of a spider and swiveled to the lower end of a screw 22 which extends through a threaded opening 23 in the center of the connecting plate 8. The screw 22 is provided with an operating device such as a winged head 24 and it is adapted to be operated to carry the cap or clamping member 21 into and out of engagement with the top of the chimney 25 of the lamp. The lamp is designed to be provided with a suitable gage 26 for enabling the amount of oil within the reservoir of the lamp to be ascertained at a glance and the length of the time the lamp will burn. The reservoir is also equipped with an overflow pipe 27 extending through the side wall of the reservoir and also through the side wall or band of the support of the stand. The upper or outlet end is designed to be located at the high water or liquid limit so as to prevent the liquid within the reservoir from flowing into the bait receptacle through the perforations thereof and the lower end of the overflow pipe is located at the bottom of the reservoir for the purpose of causing the water to flow from the reservoir while leaving the poisonous oil or liquid within the same. The reservoir is designed to be partially filled with water and to be supplied with a quantity of poisonous oil or a liquid lighter than water so as to float on the surface thereof and by having the overflow pipe arranged as set forth, the water, in event of a downfall of rain will be discharged without permitting the poisonous liquid to escape or overflow from the reservoir. The insect destroyer is designed to be lighted during the early hours of the night before the coolness thereof drives the insects to cover and it will also be effective during the day without light as the bait will attract the insects and cause the same to fall into the reservoir. The connecting plate or member also carries a reflector 28 extending downwardly and outwardly below the top of the chimney and adapted to throw the light downwardly over the lower portion of the insect destroyer so that the same will be thoroughly lighted and the insects will not be deterred from attempting to obtain the bait of the bait receptacle. The centrally arranged screw which carries the clamping cap 21 extends through both the plate or connecting member and the reflector 28.

The hood is provided with openings 17$^a$ located inside of the deflecting screen and adapted to permit insects to fall through the hood into the poisonous liquid contained in the reservoir.

What is claimed is:—

1. An insect destroyer including a reservoir, a bait receptacle located within and extending above the reservoir and provided with perforations located in the upper portion of the bait receptacle above the surface of the liquid of the reservoir and a hood extending downwardly from the bait receptacle to within the reservoir, said hood being provided with openings for the passage of insects.

2. An insect destroyer including a reservoir, a bait receptacle located within and extending above the reservoir and provided with perforations located in the upper portion of the bait receptacle above the surface of the liquid of the reservoir and a hood extending downwardly from the bait receptacle to within the reservoir, said hood being provided with openings for the passage of insects, and relatively fine wires located within the hood and arranged to be struck by insects whereby the latter are caused to fall into the reservoir.

3. An insect destroyer including a reservoir, designed to contain a poisonous liquid, a bait receptacle supported by the reservoir and extending above the liquid, and provided in its upper portion with openings, a hood extending downwardly and outwardly from the bait receptacle and a guard or deflector extending upwardly from the hood.

4. An insect destroyer including a reservoir, designed to contain a poisonous liquid, a bait receptacle supported by the reservoir and extending above the liquid, and provided in its upper portion with openings, a hood extending downwardly and outwardly from the bait receptacle and a guard or deflector extending upwardly from the hood, said hood and guard being of annular formation at the openings for the passage of insects.

In testimony whereof I affix my signature in presence of two witnesses.

JOHN C. BOWERMAN.

Witnesses:
HENRY L. JAMES,
J. H. DAVIS.

Copies of this patent may be obtained for five cents each, by addressing the "Commissioner of Patents, Washington, D. C."